United States Patent [19]

Drawert et al.

[11] E Re. 28,533

[45] Reissued Aug. 26, 1975

[54] SYNTHETIC POLYAMIDES OF A DIMERIC FATTY ACID, A LOWER ALIPHATIC CARBOXYLIC ACID, ETHYLENE DIAMINE, AND A CO-DIAMINE

[75] Inventors: Manfred Drawert, Werne an der Lippe; Eugen Griebsch, Unna, both of Germany

[73] Assignee: Schering Aktiengesellschaft, Berlin & Bergkamen, Germany

[22] Filed: Oct. 29, 1973

[21] Appl. No.: 410,309

Related U.S. Patent Documents

Reissue of:

[64] Patent No.: 3,622,604
Issued: Nov. 23, 1971
Appl. No.: 815,279
Filed: Apr. 9, 1969

U.S. Applications:

[63] Continuation-in-part of Ser. No. 527,107, Feb. 14, 1966, abandoned, which is a continuation-in-part of Ser. No. 495,319, Oct. 12, 1965, abandoned.

[30] Foreign Application Priority Data

| | | |
|---|---|---|
| Oct. 15, 1964 | Germany | Sch 35965 |
| Feb. 19, 1965 | Germany | Sch 36567 |
| Mar. 26, 1965 | Germany | Sch 36782 |

[52] U.S. Cl. ..... 260/404.5; 260/18 N; 106/20; 106/27; 106/243

[51] Int. Cl. ..... C09f 7/00

[58] Field of Search ..... 260/404.5

[56] References Cited

UNITED STATES PATENTS

| | | | |
|---|---|---|---|
| 2,379,413 | 7/1945 | Bradley | 260/404.5 |
| 2,886,543 | 5/1959 | Peerman et al. | 260/404.5 |
| 3,037,871 | 6/1962 | Floyd et al. | 260/404.5 |
| 3,224,893 | 12/1965 | Floyd et al. | 260/404.5 |
| 3,253,940 | 5/1966 | Floyd et al. | 260/404.5 |
| 3,256,304 | 6/1966 | Fischer et al. | 260/404.5 |
| 3,268,461 | 8/1966 | Jacobson | 260/404.5 |
| 3,297,730 | 1/1967 | Fischer et al. | 260/404.5 |
| 3,408,317 | 10/1968 | Vertnik | 260/404.5 |
| 3,412,115 | 11/1968 | Floyd et al. | 260/404.5 |
| 3,420,789 | 1/1969 | Wilson | 260/404.5 |
| 3,483,237 | 12/1969 | Peerman et al. | 260/404.5 |
| 3,499,853 | 3/1970 | Griebsh et al. | 260/404.5 |

*Primary Examiner*—Glennon H. Hollrah
*Attorney, Agent, or Firm*—Curtis, Morris & Safford

[57] ABSTRACT

Synthetic polyamides, useful as binders in the formulation of printing inks, formed between a dimeric fatty acid, an unsubstituted lower aliphatic monocarboxylic acid, ethylene diamine, and certain aromatic, cycloaliphatic, and other aliphatic diamines, including aliphatic ether diamines; methods for preparing such polyamides.

11 Claims, No Drawings

SYNTHETIC POLYAMIDES OF A DIMERIC FATTY ACID, A LOWER ALIPHATIC CARBOXYLIC ACID, ETHYLENE DIAMINE, AND A CO-DIAMINE

Matter enclosed in heavy brackets [ ] appears in the original patent but forms no part of this reissue specification; matter printed in italics indicates the additions made by reissue.

---

This application is a continuation-in-part of application Ser. No. 527,107, filed Feb. 14, 1966 (now abandoned), and of application Ser. No. 495,319, filed Oct. 12, 1965 (now abandoned).

This invention relates to synthetic polyamides comprising dimeric fatty acids and to methods for making the same. In particular, this invention relates to synthetic polyamides notable either for their good solubility in alcohols, particularly in ethanol, or for good solubility in solvent mixtures coupled with a high-softening point, and to methods of making such polyamides.

The polyamides of the invention are used to advantage as printing ink binders.

Polyamides comprising polymerized unsaturated fatty acids and ethylene diamine, and having a molecular weight range of from 3,000 to 5,000, are known in the art. However, only butanolic solutions of such products are stable at room temperature.

It has also been proposed in the prior art to increase the solubility of polyamides by the incorporation therein of branch-chain alkylol amines or branched dicarboxylic acids, or of branch-chain diamines having an amino group on a tertiary carbon atom.

Although certain progress has been made in the prior art toward increasing the solubility of polyamides, the disadvantages of prior art polyamides include a strong tendency toward blocking in sheets printed with inks comprising the polyamides as binders, an insufficient resistance of solutions of the polyamides to gelation, and a lack or low degree of reversibility of gel formation in such solutions. A further disadvantage in those prior art polyamides having improved solubility is that their softening point is too low to permit them to be used as printing ink binders.

*U.S. Pat. No. 3,253,940 granted May 31, 1966 teaches high-melting point alcohol-soluble polycarbonamide compositions comprising the condensation product of (A) polyalkylene polyamines of the general structure $H_2N(R'NH)_nH$ where R' is an alkylene radical having from 2 to 3 carbon atoms and n is an integer from 1 to 4, with at least one-half of the mixture of said polyalkylene polyamines being those in which n=1, (B) low aliphatic monocarboxylic acids of the general structure RCOOH where R is selected from the group consisting of hydrocarbon and saturated aliphatic hydrocarbon radicals of from one to four carbon atoms, and (C) polymeric hydrocarbon fat acids; the equivalents of amine groups employed being substantially equivalent to the equivalents of carboxylic groups employed, where at least 90 equivalent percent of the carboxylic acid groups employed are derived from the polymeric fat acids and the low aliphatic monocarboxylic acids, with the equivalent ratio of polymeric fat acids to low aliphatic monocarboxylic acids being in the range of 90:10 to 65:35.*

The present invention concerns new polyamides and their preparation by the thermal polycondensation of monocarboxylic acid, diamine, and dimerized fatty acid which may optionally contain smaller quantities of trimeric fatty acid and monomeric fatty acid. The monocarboxylic acid is a straight-chain unsubstituted (i.e. hydrocarbon) aliphatic carboxylic acid having [one] *two* to five carbon atoms, suitably a lower alkanoic monoacid such as acetic acid. As the diamine are used mixtures of ethylene diamine with either (1) [a branched] *trimethyl-hexamethylene diamine* or *a* straight-chain unsubstituted (i.e., hydrocarbon) aliphatic codiamine having six to twelve carbon atoms, particularly a $C_6$–$C_{12}$ alkylene diamine; or (2) certain aromatic and cycloaliphatic codiamines or (3) certain ether codiamines.

In particular, aromatic amines of the formulas

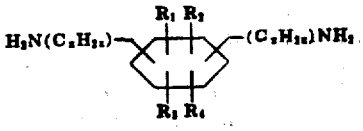

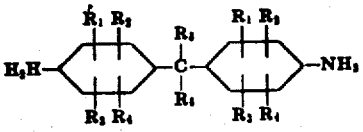

and

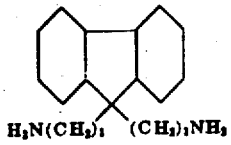

and cycloaliphatic diamines of the formula

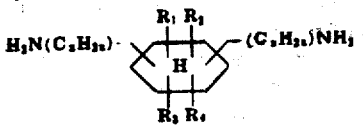

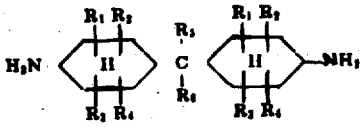

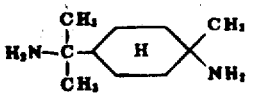

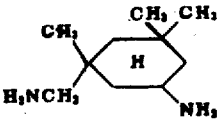

can be employed, wherein x is zero or a small integer and wherein $R_1$–$R_6$ are hydrogen or lower alkyl. Those cyclic amines in which at most two of the substituents $R_1$–$R_6$ are lower alkyl are of particular interest because of their current commercial availability.

As ether codiamines, materials having the formula $$H_2N—(CH_2)_n—O—(RO)_x—(CH_2)_n—NH_2,$$

can be used, wherein *n* is an integer from 3 to 5 inclusive, *x* is an integer from 0 to 3 inclusive, and R is an alkylene radical having from one to 12 carbon atoms, which radical may optionally have one or two alkyl substituents having from 1 to 4 carbon atoms thereon.

According to the invention, suitable aromatic and cycloaliphatic codiamines include p-phenylene diamine, m-toluylene diamine; 4,4°-diamino diphenylmethane; 3,3''-dimethyl-4,4'-diamino diphenylmethane; 4,4'-diamino diphenylpropane; 4,4'diamino dicyclohexylmethane; 3,3'-dimethyl-4,4'-diamino dicyclohexylmethane; xylylene diamine; bis-(β-aminoethyl) benzene; bis-(β-aminoethyl)-dimethylbenzene; bis-(aminomethyl)-cyclohexane; 3-aminomethyl-3,5,5-trimethyl-cyclohexylamine; 1-methyl-4(1-amino-1-methylethyl)-cyclohexylamine; and 9,9-bis-(3-aminopropyl)-fluorene.

Suitable ether codiamines include 1,7-diamino-4-oxa-heptane; 1,11-diamino-6-oxa-undecane; 1,7-diamino-3,5-dioxaheptane; 1,10-diamino-4,7-dioxa-decane; 1,10-diamino-4,7-dioxa- 5-methyl-decane; 1,11-diamino-4,8-dioxa-undecane; 1,11-diamino- 4,8-dioxa-5-methyl-undecane; 1,12-diamino-4,9-dioxa-dodecane; 1,13-diamino-4,10-dioxa-tridecane; 1,14-diamino-4,11-dioxa-tetradecane; 1,11-diamino-4,8-dioxa-5,6-dimethyl-7-propionyl- undecane; 1,14-diamino-4,7,10-trioxa-tetradecane; 1,13-diamino- 4,7,10-trioxa-5,8-dimethyl-tridecane; 1,16-diamino-4,7,10,13-tetra-oxa hexadecane; 1,11-diamino-4,8-dioxa-6,6-dimethyl-undecane; and 1,20-diamino-4,17-dioxa-eicosane.

Preferred embodiments of the invention include those in which the equivalence ratio between ethylene diamine and the codiamine is between 0.8:0.2 and 0.5:0.5, especially at 0.7:0.3, and in which the equivalence ratio between the dimeric fatty acid and the monocarboxylic acid lies between 0.8:0.2 and 0.7:0.3, particularly at 0.75:0.25. *When trimethylhexamethylene diamine is employed as the co-diamine, it is used with ethylene diamine at an equivalence ratio of 0.8:0.2.*

In the process of the invention, the greater the proportion of the aromatic, cycloaliphatic, long chain, or ether codiamine present, the better are the solubility properties of the resultant polyamide. The greater the proportion of ethylene diamine present, the higher is the softening point of the resultant polyamide.

The polyamides of the present invention do not have the disadvantages earlier described for known polyamides. They are soluble, even at room temperature, up to 60 percent in lower alcohols, particularly ethanol. The solutions are resistant to gelation, and any gelation occurring at low temperatures is reversible at room temperature. Sheets printed with compositions comprising the polyamides of the invention show little tendency to block, in contrast with those printed with known ethanol-soluble printing ink resins. Also, ink resins according to the invention show outstanding adherence and good shine on conventional carriers, especially on pretreated polyethylene. The scratch resistance of printed sheets is excellent, particularly for those polyamides comprising an ether codiamine. Resistance to cracking and scaling is also at high levels. The mechanical properties of the resin films, such as hardness and elasticity, as well as the properties desirable in the coating arts, all meet the demands imposed on them.

Production of the polyamide resins of the invention involves reaction of the diamines, dimeric fatty acid, and monocarboxylic acid at condensation temperatures between about 180°C and about 250°C., especially at about 230°C. Any remaining water of condensation is conveniently removed by applying a vacuum for 1 to 2 hours. In place of the free dimeric fatty acids, their amide-forming derivatives can also be used, such as their esters, in particular those which easily undergo aminolysis, such as the methyl and ethyl esters.

For preparation of the polyamides of the invention, those dimeric fatty acids are used which can be obtained by the free radical, ionic, or thermal polymerization of fatty acids. The fatty acid can be saturated or a mono- or poly-ethylenically or acetylenically unsaturated natural or synthetic aliphatic monobasic acid, suitably having eight to 24 carbon atoms. These fatty acids can be polymerized by different means, but all give functionally similar products which can generally be characterized as polymeric fatty acids. The polymer products usually contain a predominant amount of dimeric fatty acids, and smaller amounts of trimeric or higher polymeric, as well as monomeric, fatty acids. The term "dimeric fatty acid" as used in the specification and claims is to be understood to refer also to such mixtures containing small quantities of non-dimeric materials.

Polymerization of saturated fatty acids can be carried out at elevated temperatures with peroxide catalysts such as di-t-butyl-peroxide, for example. The straight chain and branch-chain acids such as caprylic, pelargonic, capric, lauric, myristic, palmitic, isopalmitic, stearic, arachidic, behinic, and lignoceric acids are suitable saturated fatty acids. However, this process is of little interest because of the small yield.

The polymerization of ethylenically unsaturated fatty acids is much more common. This can be done with or without catalysts, but uncatalyzed polymerization requires higher temperatures. Suitable catalysts are acid or alkaline clays, di-t-butyl-peroxide, boron trifluoride and other Lewis acids, anthroquinone, sulfur trioxide, and the like. The monomeric fatty acids commonly polymerized include the branched-chain and straight-chain, poly- and/or mono-ethylenically unsaturated acids such as 3-octene acid, 11-dodecene acid, linderic acid, lauroleic, oleic, elaidic, vaccenic, gadoleic, cetoleic, erucic, linoleic, linolenic, elaostearic, arachidic, clupanodonic, nisinic, and chaulmoogra oil acid.

The acetylenically unsaturated fatty acids, which can be polymerized in the absence of catalysts because of their higher reactivity, seldom occur in nature and are expensive to synthesize. For this reason they are economically less interesting. A number of acetylenically unsaturated fatty acids, either straight chain or branch chain, mono-unsaturated or polyunsaturated, can be used for the preparation of polymeric fatty acids. For example, 6-octadecyn, 9-octadecyn, 13-dokosyn, and 17-octadecen-9,11-diyn acids can be mentioned.

Because of their low cost and relatively easy polymerizability, oleic acid and linoleic acid are preferred as starting materials for the preparation of polymeric fatty acids.

The usual approximate composition of the commercial dimeric fatty acid product prepared from an unsaturated $C_{18}$—fatty acid is: 5–15 percent by weight of $C_{18}$—monocarboxylic acid, 60–80 percent by weight of $C_{36}$—dicarboxylic acid, and 10–35 percent by weight of $C_{54}$—tricarboxylic acid and higher carboxylic acid products.

The mixture obtained by polymerization can be fractionated by the usual distillation or solvent extraction methods. They can be hydrogenated before or after distillation in order to decrease the degree of unsaturation using high pressure hydrogen in the presence of a hydrogenation catalyst.

The preferred content of dimeric fatty acids in the fatty acid used in the present invention is between 55 and 100 percent by weight. The content of mixtures of monomeric, dimeric, and trimeric fatty acids can be determined either by gas chromotography or according to the microdistillation method of Paschke, J. Am. Oil Chem. Soc. XXXI, No. 1, 5 (1954).

A better understanding of the present invention and of its many advantages will be had by referring to the following specific examples, given by way of illustration.

EXAMPLE 1

400 grams of a commercially available dimerized fatty acid (0.75 equivalent) prepared from an unsaturated $C_{18}$—fatty acid and having a content of about 75 percent dimeric fatty acid, 15 percent trimeric fatty acid, and 10 percent monomeric fatty acid, 28.1 grams of glacial acetic acid (0.25 equivalent), 39.45 grams of ethylene diamine (0.70 equivalent), and 32.7 grams of hexamethylene diamine (0.3 equivalent) were mixed together and heated to 125° C. over a period of about 15 minutes under a nitrogen atmosphere with stirring. This temperature was maintained for half an hour, then the mixture was raised to 225° C. over a period of 2 hours and held at this temperature for 3 additional hours. Finally, a vacuum of 15 mm. Hg. was applied for 1 more hour at a temperature of 225 °C.

The resulting product had an amine number of 2.64, an acid number of 2.02, and a ring-and-ball softening point of 113°C.

The polyamide obtained was soluble in ethanol throughout the entire concentration range up to 60 percent.

Examples 2–10 tabulated in tables I and II below were prepared in analogous fashion using other monocarboxylic acids and aliphatic codiamines. The polyamide products are all soluble in ethanol, and their alcoholic solutions can be prepared either cold or at the boiling point.

TABLE II

| Ex. No. | Amine No. | Acid No. | Softening point (°C) | Upper limit of solubility in ethanol,[1] percent |
|---|---|---|---|---|
| 2 | 2.61 | 2.20 | 119 | 60 |
| 3 | 1.80 | 1.71 | 124 | 45 |
| 4 | 2.05 | 1.37 | 112.5 | 60 |
| 5 | 2.22 | 2.13 | 126 | 60 |
| 6 | 1.59 | 1.58 | 115 | 50 |
| 7 | 3.53 | 2.84 | 116 | 50 |
| 8 | 2.91 | 1.23 | 123 | 45 |
| 9 | 2.10 | 2.24 | 119 | 45 |
| 10 | 2.87 | 2.41 | 121 | 10 |

[1]Dissolved in 24 hrs. in cold solvent.
[2]Dissolved in ½ hr. in werm solvent.

Example 11

200 grams of dimeric fatty acid (0.75 equivalent), 14.05 grams of acetic acid (0.25 equivalent), 19.7 grams of ethylene diamine (0.7 equivalent), and 17.15 grams of m-toluylene diamine (0.3 equivalent) were mixed and heated to 125° C. over a period of 15 minutes. This temperature was maintained for 30 minutes.

Thereafter, the temperature was raised over a period of 2 hours to 225° C. and held at this temperature for a further 3 hours. Finally, a vacuum of about 15 mm. Hg. was applied for a further hour.

The polymer product had an amine number of 2,23, an acid number of 3.69, and a softening point (ring and ball) of 112°C.

Additional polyamides were prepared according to the invention in an analogous fashion. Tables III and IV summarize the results of further Examples 12–24.

TABLE I

| Example No. | Dimeric fatty acid (gm.) | Purity (dimer content in percent) | Monocarboxylic acid (gm.) | Equivalence ratio of acids | Ethylene diamine (gm.) | Co-diamine (gm.) | Equivalence ratio of diamines |
|---|---|---|---|---|---|---|---|
| 2 | 200 | Ca. 75 | 14.05 Ac | 0.75:0.25 | 19.72 | 22.78 NDA | 0.7:0.3 |
| 3 | 200 | Ca. 75 | 14.05 Ac | 0.75:0.25 | 22.55 | 15.18 NDA | 0.8:0.2 |
| 4 | 200 | Ca. 75 | 14.05 Ac | 0.75:0.25 | 16.90 | 30.38 NDA | 0.6:0.4 |
| 5 | 200 | Ca. 75 | 20.3 Ac | 0.80:0.20 | 25.03 | 16.87 NDA | 0.8:0.2 |
| 6 | 200 | Ca. 99 | 14.05 Ac | 0.75:0.25 | 19.72 | 22.78 NDA | 0.7:0.3 |
| 7 | 400 | Ca. 75 | 21.05 Ac | 0.80:0.20 | 42.24 | 27.75 TMD | 0.8:0.2 |
| 8 | 200 | Ca. 75 | 17.32 Pr | 0.75:0.25 | 19.72 | 22.78 NDA | 0.7:0.3 |
| 9 | 400 | Ca. 75 | 41.25 Pr | 0.75:0.25 | 33.89 | 43.55 HDA | 0.6:0.4 |
| 10 | 200 | Ca. 75 | 26.51 Pr | 0.70:0.30 | 21.17 | 30.08 DDA | 0.7:0.3 |

Note—Ac=acetic acid, Pr=propionic acid, NDA=1,9-diamino nonane, TMD=trimethyl hexamethylene diamine, HDA=hexamethylenediamine, DDA=1,12-diamino dodecane

TABLE III

| Example No. | Dimeric fatty acid (gm.) | Monocarboxylic acid (gm.) | Equivalence ratio of acids | Ethylene diamine (gm.) | Co-diamine (gm.) | Equivalence ratio of diamines |
|---|---|---|---|---|---|---|
| 12 | 200 | 14.05 Ac | 0.75:0.25 | 19.7 | 15.17 p-phenylene diamine | 0.7:0.3 |
| 13 | 200 | 14.05 Ac | 0.75:0.25 | 19.7 | 27.8 4,4'-diamino diphenylmethane | 0.7:0.3 |
| 14 | 200 | 14.05 Ac | 0.75:0.25 | 19.7 | 31.7 3,3'-dimethyl-4,4'-diamino diphenylmethane | 0.7:0.3 |
| 15 | 200 | 14.05 Ac | 0.75:0.25 | 19.7 | 29.8 4,4'-diamino-dicyclohexylmethane | 0.7:0.3 |
| 16 | 200 | 14.05 Ac | 0.75:0.25 | 19.7 | 33.45 3,3'-dimethyl-4,4'-diamino dicyclohexylmethane | 0.7:0.3 |
| 17 | 200 | 14.05 Ac | 0.75:0.25 | 16.89 | 31.0 1,4-bis-(aminoethyl)-benzene | 0.6:0.4 |
| 18 | 200 | 14.05 Ac | 0.75:0.25 | 22.52 | 17.98 1,4-bis-(aminoethyl)-2,5-dimethylbenzene | 0.8:0.2 |
| 19 | 400 | 14.05 Ac | 0.75:0.25 | 39.45 | 47.75 3-aminomethyl-3,5,5-trimethylcyclohexylamine | 0.7:0.3 |
| 20 | 400 | 37.7 Pr | 0.75:0.25 | 39.45 | do | 0.7:0.3 |
| 21 | 400 | 52.9 Bu | 0.7:0.3 | 42.25 | 51.30 3-aminomethyl-3,5,5-trimethyl cyclohexylamine | 0.7:0.3 |
| 22 | 200 | 10.05 Ac | 0.8:0.2 | 18.50 | 21.60 1-methyl-4(1-amino-1-methyl-ethyl) cyclohexylamine | 0.7:0.3 |
| 23 | 200 | 14.05 Ac | 0.75:0.25 | 19.7 | 22.18 1-methyl-4(1-amino-1-methyl-ethyl) cyclohexylamine | 0.7:0.3 |
| 24 | 200 | 14.05 Ac | 0.75:0.25 | 19.7 | 40.2 9,9-bis(aminopropyl)-fluorene | 0.7:0.3 |

Note—Ac=acetic acid, Pr=propionic acid, Bu=butyric acid.

TABLE IV

| Example No. | Amine No. | Acid No. | Softening point (°C.) |
|---|---|---|---|
| 12 | 1.58 | 2.80 | 115 |
| 13 | 2.43 | 1.82 | 105 |
| 14 | 1.59 | 4.08 | 109 |
| 15 | 2.06 | 2.25 | 113.5 |
| 16 | 2.03 | 2.15 | 113 |
| 17 | 1.71 | 1.70 | 132 |
| 18 | 1.33 | 2.12 | 119 |
| 19 | 2.80 | 2.51 | 117 |
| 20 | 2.41 | 2.68 | 120 |
| 21 | 2.33 | 2.51 | 124 |
| 22 | — | — | 109 |
| 23 | 4.67 | 5.53 | 114 |
| 24 | 1.08 | 3.05 | 120 |

with stirring in an inert gas atmosphere. The temperature was held at 125° C. for one-half hour, then raised to 225° C. over a period of 2 hours, and left at the latter temperature for 5 hours. During the last 2 hours, a vacuum of about 15–20 mm./Hg. was applied.

The resulting polyamide resin had an amine number of 2.59, an acid number of 2.64, and a ring and ball softening point of 120.5° C. The product could easily be dissolved in ethanol by shaking, either at room temperature or at the boiling point.

Additional polyamides were prepared according to the invention in an analogous fashion. Tables V and VI summarize the results of further Examples 26–35.

TABLE V

| Example No. | Dimeric fatty acid (gm.) | Monocarboxylic acid (gm.) | Equivalence ratio of acids | Ethylene diamine (gm.) | Co-diamine (gm.) | Equivalence ratio of diamines |
|---|---|---|---|---|---|---|
| 26 | 200 | 14.05 Ac | 0.75:0.25 | 19.70 | 26.4 1,11-diamino-6-oxaundecane | 0.7:0.3 |
| 27 | 400 | 28.10 Ac | 0.75:0.25 | 39.44 | 49.4 1,10-diamino-4,7-dioxa-decane | 0.7:0.3 |
| 28 | 200 | 18.65 Ac | 0.70:0.30 | 21.13 | 28.72 1,10-diamino-4,7-dioxa-5-methyl-decane | 0.7:0.3 |
| 29 | 400 | 28.10 Ac | 0.75:0.25 | 39.44 | 53.65 1,11-diamino-4,8-dioxa-undecane | 0.7:0.3 |
| 30 | 200 | 14.05 Ac | 0.75:0.25 | 19.70 | 28.60 1,11-diamino-4,8-5-methyl-undecane | 0.7:0.3 |
| 31 | 200 | 10.52 Ac | 0.80:0.20 | 19.70 | 22.50 1,12-diamino-4,9-dioxa-dodecane | 0.75:0.25 |
| 32 | 200 | 14.05 Ac | 0.75:0.25 | 22.50 | 20.60 1,13-diamino-4,10-dioxa-tridecane | 0.8:0.2 |
| 33 | 200 | 14.05 Ac | 0.75:0.25 | 22.50 | 20.6 1,13-diamino-4,7,10-trioxa-tridecane | 0.8:0.2 |
| 34 | 200 | 17.35 Pr | 0.75:0.25 | 19.70 | 24.72 1,10-diamino-4,7-dioxa-decane | 0.7:0.3 |
| 35 | 200 | 20.6 Bu | 0.75:0.25 | 19.70 | do | 0.7:0.3 |

Note— Ac=acetic acid. Bu=butyric acid. Pr=propionic acid.

TABLE VI

| Example No. | Amine No. | Acid No. | Softening point (°C.) |
|---|---|---|---|
| 26 | 0.96 | 3.63 | 112 |
| 27 | 2.23 | 2.12 | 113 |
| 28 | 1.29 | 2.47 | 117.5 |
| 29 | 2.51 | 2.02 | 112.5 |
| 30 | 1.53 | 2.61 | 111 |
| 31 | 1.30 | 2.84 | 110.5 |
| 32 | 1.95 | 2.49 | 116.5 |
| 33 | 1.84 | 2.93 | 119 |
| 34 | 2.64 | 1.50 | 122 |
| 35 | 2.89 | 1.37 | 123 |

Solutions of the polyamides according to the invention can be prepared in concentrations of at least 30 percent either at boiling temperatures or at room temperature.

For purposes of comparison, Examples 1 to 20 of U.S. Pat. No. 2,450,940 were repeated. The product prepared according to Example 1 of the patent is insoluble in ethanol. A 30 percent solution in isopropanol gels at room temperature. A 30 percent solution butanol showed a strong increase in viscosity after several weeks standing. The polyamide prepared according to Example 20 of the patent also did not given stable 30 percent solutions in the alcohols mentioned.

EXAMPLE 25

Four-hundred grams of dimerized fatty acid (0.75 equivalent), 28.1 g. of acetic acid (0.25 equivalent), 45.08 g. of ethylene diamine (0.8 equivalent), and 25.12 g. of 1,7-diamino-4-oxaheptane (0.2 equivalent) were mixed with one another and heated to 125° C.

What I claim:

[1. A synthetic polyamide prepared by cocondensing, at a temperature between about 180° C. and about 250° C., substantially equivalent amounts of an acid component consisting essentially of (1) a dimeric fatty acid prepared by polymerizing a monobasic acid of an aliphatic hydrocarbon having eight to 24 carbon atoms and (2) a monobasic straight chain alkanoic acid having one to five carbon atoms, and of an amine component consisting essentially of ethylene diamine and a co-diamine selected from the group consisting of (1) an alkylene diamine having six to 12 carbon atoms; (2) an aromatic diamine having one of the following formulas:

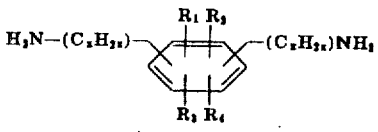

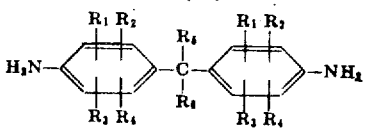

and

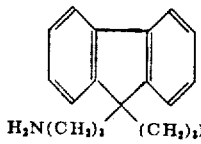

(3) a cycloaliphatic diamine having one of the following formulas:

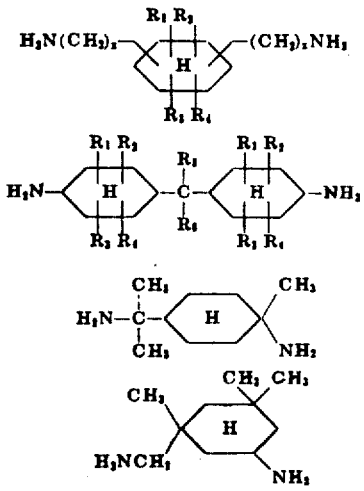

wherein $x$ in said formulas is zero or a small whole number from 1 to 3 inclusive, and wherein $R_1$–$R_6$ are hydrogen and up to two of said radicals $R_1$–$R_6$ may be lower alkyl; and (4) an ether diamine of the formula $$H_2N—(CH_2)_n—O—(RO)_x—(CH_2)_n—NH_2$$

wherein $n$ is an integer from 3 to 5 inclusive, $x$ is zero or an integer from 1 to 3 inclusive, and R is an unsubsituted alkylene radical having one to 12 carbon atoms or such a raical having one or two alkyl substituents thereon, said substituents having one to four carbon atoms, the equivalence ratio between said dimeric fatty acid and said monobasic acid being between 0.8:0.2 and 0.7:0.3, and the equivalence ratio between said ethylene diamine and said codiamine being between 0.8:0.2 and 0.5:0.5.]

2. A polyamide as in claim 1 wherein said monocarboxylic acid is acetic acid.

3. A polyamide as in claim 1 wherein a mixture of ethylene diamine and an alkylene diamine having six to 12 carbon atoms is employed.

4. A polyamide as in claim 3 wherein said alkylene diamine is 1,6-diaminohexane, 1,9-diaminononane, *or* 1,12-diaminododecane [, or trimethyl-hexamethylene diamine] .

5. A polyamide as in claim 1 wherein a mixture of ethylene diamine and an aromatic diamine is employed.

6. A polyamide as in claim 5 wherein said aromatic diamine is 1,4-bis(aminoethyl)-benzene or 9,9-bis-(aminopropyl)-fluorene.

7. A polyamide as in claim 1 wherein a mixture of ethylene diamine and a cycloaliphatic diamine are employed.

8. A polyamide as in claim 7 wherein said cycloaliphatic diamine is 3-aminomethyl-3,5,5-trimethyl-cyclohexylamine.

9. A polyamide as in claim 1 wherein a mixture of ethylene diamine and an ether diamine is employed.

10. A polyamide as in claim 9 wherein said ether diamine is 1,10-diamino-4,7-dioxa-decane, 1,10-diamino-4,7- dioxa-5-methyl-decane, 1,13-diamino-4,7,10-trioxa-decane, and 1,12-diamino-4,9-dioxa-dodecane.

*11. A synthetic polyamide prepared by cocondensing, at a temperature between about 180°C. and about 250°C., substantially equivalent amounts of an acid component consisting essentially of a dimeric fatty acid prepared by polymerizing a monobasic acid of an aliphatic hydrocarbon having eight to 24 carbon atoms and (2) acetic acid, and of an amine component consisting essentially of ethylene diamine and trimethylhexamethylene diamine, the equivalence ratio between said dimeric fatty acid and said acetic acid being 0.80:0.20, and the equivalence ratio between said ethylene diamine and said trimethylhexamethylene diamine being 0.8:0.2.*

*12. A synthetic polyamide prepared by cocondensing, at a temperature between about 180°C. and about 250°C., substantially equivalent amounts of an acid component consisting essentially of (1) a dimeric fatty acid prepared by polymerizing a monobasic acid of an aliphatic hydrocarbon having eight to 24 carbon atoms and (2) a monobasic straight chain alkanoic acid having two to five carbon atoms, and of an amine component consisting essentially of ethylene diamine and a co-diamine selected from the group consisting of (1) a straight chain alkylene diamine having six to 12 carbon atoms; (2) an aromatic diamine having one of the following formulas:*

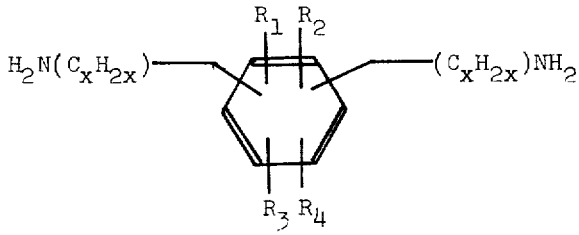

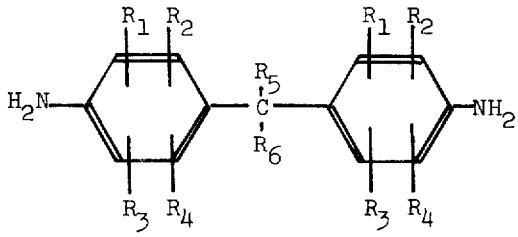

*and*

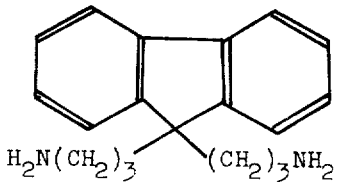

*(3) a cycloaliphatic diamine having one of the following formulas:*

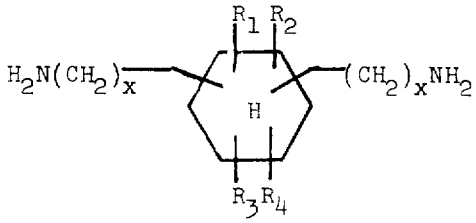

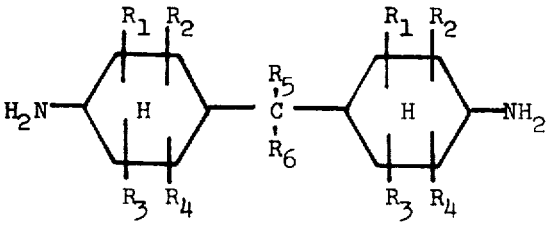

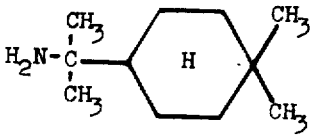

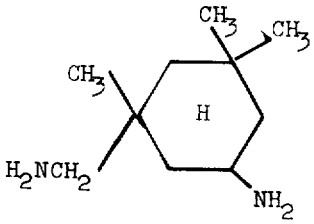

*wherein x in said formulas is zero or a small whole number from 1 to 13 inclusive, and wherein $R_1-R_6$ are hydrogen and up to two of said radicals $R_1-R_6$ may be methyl; and (4) an ether diamine of the formula*

$$H_2N-(CH_2)_n-O-(RO)_x-(CH_2)_n-NH_2$$

*wherein n is an integer from 3 to 5 inclusive, x is zero or an integer from 1 to 5 inclusive, and R is an unsubstituted alkylene radical having 1 to 12 carbon atoms or such a radical having a methyl substituent thereon, the equivalence ratio between said dimeric fatty acid and said monobasic acid being between 0.8:0.2 and 0.7:0.3, and the equivalence ratio between said ethylene diamine and said codiamine being between 0.8:0.2 and 0.5:0.5.*

* * * * *

PO-1050
(5/69)

UNITED STATES PATENT OFFICE
CERTIFICATE OF CORRECTION

Patent No. Re. 28533 Dated August 26, 1975

Inventor(s) Manfred Drawert et al.

It is certified that error appears in the above-identified patent and that said Letters Patent are hereby corrected as shown below:

In Claim 12, column 11, line 20, replace the formula by

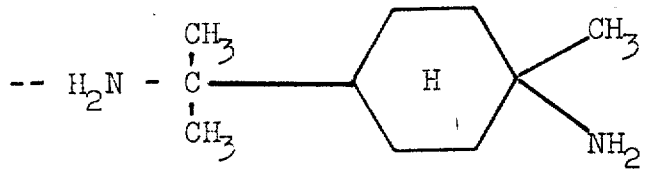

In Claim 12, column 12, line 11, replace "13" by -- 3 --.

In Claims 2, 3, 5, 7, and 9, line 1 of each, replace "1" by -- [1] 12 --.

Signed and Sealed this sixth Day of January 1976

[SEAL]

Attest:

RUTH C. MASON
Attesting Officer

C. MARSHALL DANN
Commissioner of Patents and Trademarks